US012768466B2

(12) United States Patent
Shou et al.

(10) Patent No.: US 12,768,466 B2
(45) Date of Patent: Oct. 20, 2026

(54) BALL VALVE

(71) Applicant: ZHEJIANG DUNAN ARTIFICIAL ENVIRONMENT CO., LTD., Shaoxing (CN)

(72) Inventors: Zhouyang Shou, Shaoxing (CN); Yongbin Xuan, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 0 days.

(21) Appl. No.: 18/637,496

(22) Filed: Apr. 17, 2024

(65) Prior Publication Data

US 2024/0280187 A1 Aug. 22, 2024

Related U.S. Application Data

(63) Continuation of application No. PCT/CN2022/122171, filed on Sep. 28, 2022.

(30) Foreign Application Priority Data

Oct. 29, 2021 (CN) ......................... 202122654724.6

(51) Int. Cl.
*F16K 31/60* (2006.01)
*F16K 5/06* (2006.01)
(Continued)

(52) U.S. Cl.
CPC ............ *F16K 31/60* (2013.01); *F16K 5/0626* (2013.01); *F16K 5/0647* (2013.01); *F16K 5/08* (2013.01);
(Continued)

(58) Field of Classification Search
CPC ........ F16K 31/60; F16K 5/201; F16K 5/0626; F16K 5/0647; F16K 5/08; F16K 27/067; F16K 27/08; F16K 5/20
(Continued)

(56) References Cited

U.S. PATENT DOCUMENTS 1,849,395 A * 3/1932 Andrews ............... F16K 5/0407 137/246.22
1,906,266 A * 5/1933 Hoffman ................. F16K 5/201 251/366
(Continued)

FOREIGN PATENT DOCUMENTS

AU 3444495 A 6/1996
CN 101285529 A 10/2008
(Continued)

OTHER PUBLICATIONS

International Search Report of PCT/CN2022/122171.
European search report of EP22885570.6.
First Notice of Reasons for Rejection of JP2024-519308.

*Primary Examiner* — John Bastianelli

(57) ABSTRACT

The present application relates to a ball valve. The ball valve includes a valve body, an end cover and a valve rod. The end cover is installed on the valve body, and one end of the valve rod is rotatably installed in the valve body, the other end of the valve rod extends out of the valve body through the end cover. A limiting member is arranged on an inner peripheral wall of the end cover, and the valve rod is capable of being limited by the limiting member to allow a maximum rotating angle of the valve rod in the end cover to be 90 degrees.

8 Claims, 4 Drawing Sheets

(51) Int. Cl.
*F16K 5/08* (2006.01)
*F16K 5/20* (2006.01)
*F16K 27/06* (2006.01)
*F16K 27/08* (2006.01)

(52) U.S. Cl.
CPC ................ *F16K 5/20* (2013.01); *F16K 5/201* (2013.01); *F16K 27/067* (2013.01); *F16K 27/08* (2013.01)

(58) Field of Classification Search
USPC ........................ 251/315.01–315.16, 286–288
See application file for complete search history.

(56) References Cited

U.S. PATENT DOCUMENTS

| | | | | | |
|---|---|---|---|---|---|
| 1,966,403 | A * | 7/1934 | Durham | F16L 41/084 219/137 R |
| 3,743,243 | A | 7/1973 | Scaramucci | |
| 4,936,545 | A * | 6/1990 | Ferrero | F16K 5/0636 251/315.12 |
| 5,577,709 | A * | 11/1996 | Gugala | F16K 41/046 251/315.14 |
| 5,628,493 | A * | 5/1997 | McKnight | F16K 5/0642 137/454.2 |
| 6,431,520 | B1 * | 8/2002 | Ferrer Beltran | F16K 5/0694 251/315.1 |
| 9,933,101 | B2 * | 4/2018 | Lildholdt | F16L 55/105 |

FOREIGN PATENT DOCUMENTS

| | | | |
|---|---|---|---|
| CN | 101392841 | A | 3/2009 |
| CN | 201339725 | Y | 11/2009 |
| CN | 102287569 | A | 12/2011 |
| CN | 102359616 | A | 2/2012 |
| CN | 110397752 | A | 11/2019 |
| CN | 216112404 | U | 3/2022 |
| CN | 217381703 | U | 9/2022 |
| KR | 200319367 | Y1 | 7/2003 |

* cited by examiner

BALL VALVE

CROSS-REFERENCE TO RELATED APPLICATIONS

This application is a continuation of international patent application No. PCT/CN2022/122171, filed on Sep. 28, 2022, which itself claims priority to Chinese Patent Application No. 202122654724.6, filed on Oct. 29, 2021, and titled “BALL VALVE”. The contents of the above identified application are hereby incorporated herein in their entireties by reference.

TECHNICAL FIELD

The present disclosure relates to the field of flow control technology, and in particular, to a ball valve.

BACKGROUND

A ball valve is a type of valve that utilizes a ball as an opening and closing element. Typically, the ball valve is driven by a valve rod and can rotate around an axis of the valve rod.

During the operation of the ball valve, the valve rod drives the ball to rotate within the valve body by only 90 degrees, enabling the ball valve to function as an on-off valve. At present, a common method to restrict rotation of the ball driven by the valve rod is to place a boss on an end surface of the valve seat in the ball valve. A limit pin (or a limit piece) is then attached to the valve rod to constrain the rotation angle of the valve rod by a contact between the boss and the limit pin (or the limit piece). However, installing the limit pin (or the limit piece) on the valve rod can be challenging, requiring high processing costs. Moreover, the material costs of the limit pin (or the limit piece) and the boss is high.

SUMMARY

According to various embodiments of the present disclosure, a ball valve is provided.

The present disclosure provides a ball valve. The ball valve includes a valve body, an end cover and a valve rod. The end cover is installed on the valve body, and one end of the valve rod is rotatably installed in the valve body, the other end of the valve rod extends out of the valve body through the end cover. A limiting member is arranged on an inner peripheral wall of the end cover, the valve rod is capable of being limited by the limiting member to allow a maximum rotating angle of the valve rod in the end cover to be 90 degrees.

In some embodiments, the valve rod is capable of being limited by the limiting member in a surface-to-surface contact manner.

In some embodiments, the limiting member is provided with a first abutting surface and a second abutting surface, the first abutting surface is perpendicular to the second abutting surface, the limiting member is capable of limiting the valve rod through the first abutting surface and the second abutting surface respectively.

In some embodiments, a rotating radius of the valve rod is defined as R, a half of a thickness of an end of the valve rod extending out of the valve body is defined as L, and a width of an end surface of the limiting member for abutting against the valve rod is defined as I, wherein, the radius R of rotation of the valve rod, the half L of a thickness of an end of the valve rod extending out of the valve body and the width I of an end surface of the limiting member for abutting against the valve rod satisfy following formula: $I=\sqrt{R^2-L^2}-L$.

In some embodiments, the number of the limiting member is one. Alternatively, the number of the limiting member is two, and the two limiting members are symmetrical with respect to an axis of the valve rod.

In some embodiments, the limiting member is disposed on the inner peripheral wall of the end cover by welding. Alternatively, the limiting member and the end cover are an integrated structure.

In some embodiments, a projection of the inner peripheral wall of the end cover toward the limiting member is capable of covering the limiting member.

In some embodiments, the valve rod is provided with a first step surface, and an end surface of the limiting member towards the valve body abuts against the first step surface.

In some embodiments, the valve rod is provided with a second step surface and the second step surface abuts against an end surface of the end cover towards the valve body.

In some embodiments, a valve seat is fixed on the valve body by welding, and the end cover is connected to the valve seat by a threaded way.

In some embodiments, the valve rod is capable of being limited by the limiting member in a line-to-surface contact manner.

Details of one or more embodiments of this application are presented in the attached drawings and descriptions below. And other features, purposes and advantages of this application will become apparent from the description, drawings and claims.

BRIEF DESCRIPTION OF THE DRAWINGS

For a better description and illustration of embodiments and/or examples of those inventions disclosed herein, reference may be made to one or more attached drawings. Additional details or examples used to describe the drawings should not be considered as limiting the scope of any of the disclosed inventions, currently described embodiments and/or examples, and currently understood best modes of these inventions.

In the figures, 100 represents a ball valve; 10 represents a valve body; 20 represents an end cover; 21 represents an inner peripheral wall; 30 represents a valve rod; 31 represents a first step surface; 32 represents a second step surface; 40 represents a valve seat; 50 represents a limiting member; 51 represents a first abutting surface; and 52 represents a second abutting surface.

DETAILED DESCRIPTION

The technical solutions in the embodiments of this application will be clearly and completely described below with reference to the accompanying drawings in the embodiments of this application. It is obvious that the described embodiments are only a part of the embodiments, but not all of the embodiments. All other embodiments obtained by a person of ordinary skill in the art based on the embodiments of the present application without creative efforts shall fall within the protection scope of the present application.

It should be noted that when the component is referred to as being "mounted to" another component, it may be directly on the other component or may also be an intervening component. When one component is considered to be "disposed on" another component, it may be directly disposed on another component or there may be an intervening component simultaneously. When one component is considered to be "fixed to" another component, it may be directly fixed on another component or there may be an intervening component at the same time.

Unless otherwise defined, all technical and scientific terms used herein have the same meaning as commonly understood by one skilled in the art to which this application belongs. The terminology used herein in the specification of the present application is for the purpose of describing particular embodiments only and is not intended to be limiting of the present application. As used herein, the terms "or/and" include any and all combinations of one or more of the associated listed items.

Figure 1:
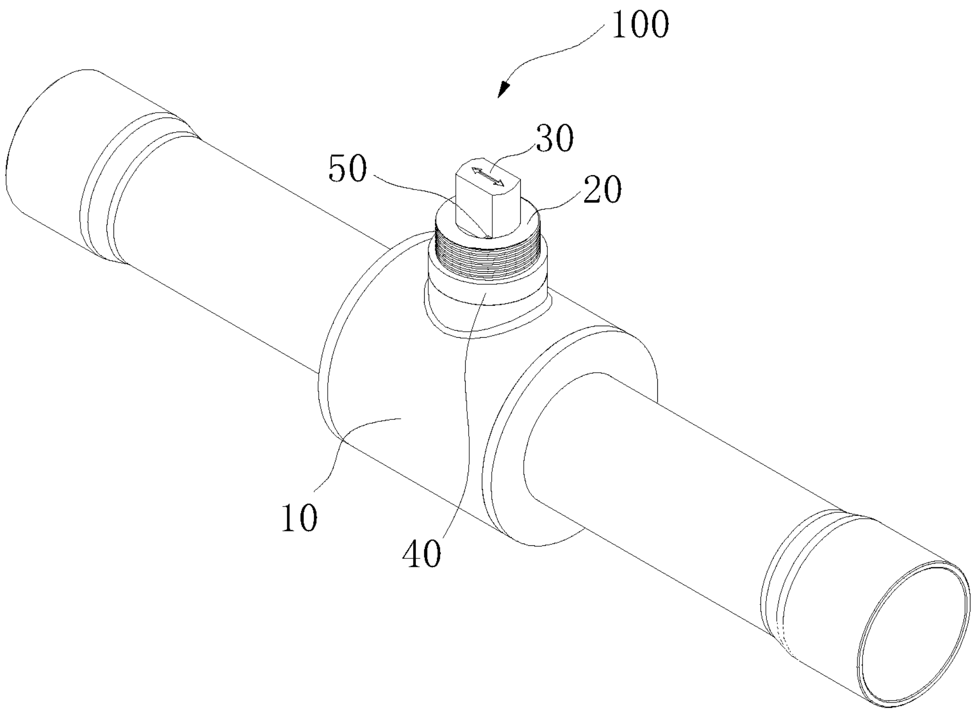
FIG. 1 is a schematic view of a ball valve according to one or more embodiments.
Figure 2:
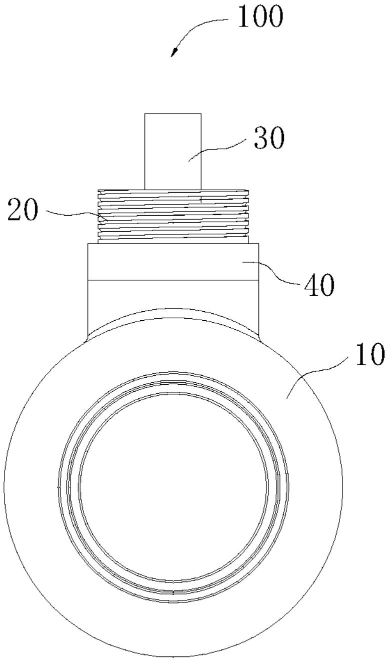
FIG. 2 is a schematic view of a ball valve from another perspective according to one or more embodiments.
Figure 6:
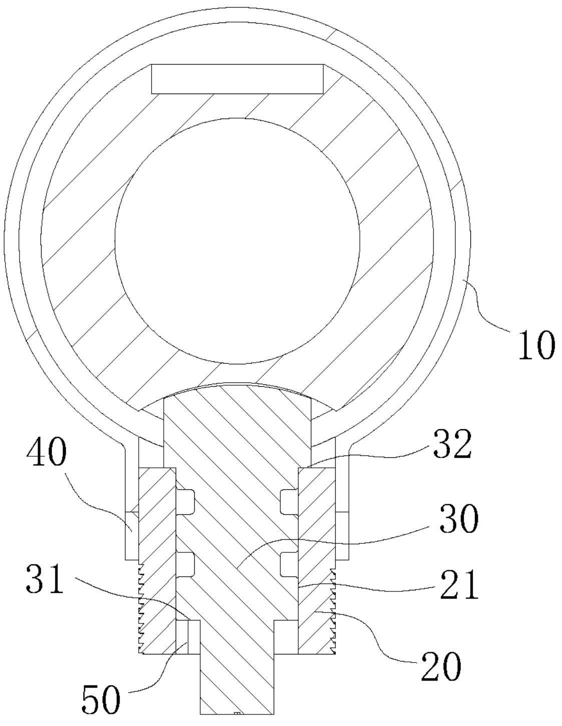
FIG. 6 is a sectional view of a ball valve according to one or more embodiments.

Referring to FIG. 1 and FIG. 6, in an embodiment, the present disclosure provides a ball valve 100. The ball valve includes a valve body 10, an end cover 20, a valve rod 30 and a valve seat 40.

In this embodiment, the valve seat 40 is fixed on the valve body 10 by welding, and the end cover 20 is connected to the valve seat 40 by screwing, so as to realize an assembly connection of the end cover 20 on the valve body 10, which facilitates an installation of the end cover 20 on the valve body 10.

In this embodiment, one end of the valve rod 30 is rotatably installed in the valve body 10, and the other end of the valve rod 30 extends outward through the end cover 20, so that when the ball valve 100 is in operation, it is convenient to drive the valve rod 30 to rotate on the valve body 10, so as to meet an operation of opening and closing the ball valve 100. It should be noted that a ball (not shown) is connected to a part of the valve rod 30 located in the valve body 10, so that the valve rod 30 can simultaneously drive the ball to rotate in the valve body 10 and realize the on/off operation of the ball valve 100.

In this embodiment, an inner peripheral wall 21 of the end cover 20 is provided with a limiting member 50, and the valve rod 30 is capable of being limited by the limiting member 50 to allow a maximum rotating angle of the valve rod 30 in the end cover 20 to be 90 degrees. So as to meet a use requirement that the valve rod 30 is limited to rotate 90 degrees when the ball valve 100 is on and off. It should be noted that, in some embodiments, the limiting member 50 can be a block structure, which is not specifically limited here.

It can be understood that the ball valve 100 of this embodiment is provided with the limiting member 50 on the inner peripheral wall 21 of the end cover 20, then a rotation angle range of the valve rod 30 can be limited by a limiting fit between the limiting member 50 and the valve rod 30. That is, through such reasonable structural arrangement, the ball valve has advantages of simplifying a structure, reducing a processing difficulty and facilitating an installation while still meeting the requirements for limiting the rotation angle of the valve rod, thereby reducing a production cost of the ball valve 100.

In this embodiment, the valve rod 30 is capable of being limited by the limiting member 50 in a surface-to-surface contact manner, thereby improving a stability when the valve rod 30 collides with the limiting member 50, and ensuring that a maximum rotation angle of the valve rod 30 relative to the end cover 20 is 90 degrees, that is, limiting a rotation angle of the ball driven by the valve rod 30 within the valve body to be 90 degrees, so that the ball valve 100 can be stably maintained in an open or closed working state, and a working stability of the ball valve 100 is improved. It should be noted that a limiting fit between the valve rod 30 and the limiting member 50 is not limited to the manner of surface-to-surface contact shown in FIG. 5.

In some embodiments, the limiting member 50 is provided with a first abutting surface 51 and a second abutting surface 52, the first abutting surface 51 is perpendicular to the second abutting surface 52, the limiting member 50 is capable of being matched with two end surfaces of the valve rod 30 in a thickness direction through the first abutting surface 51 and the second abutting surface 52, respectively, so as to limit the valve rod 30. With this arrangement, it has the effects of simplifying the structure and reducing the production cost while still meeting the requirements for limiting the rotation angle of the limiting member 50 with respective to the valve rod 30.

Figure 5:
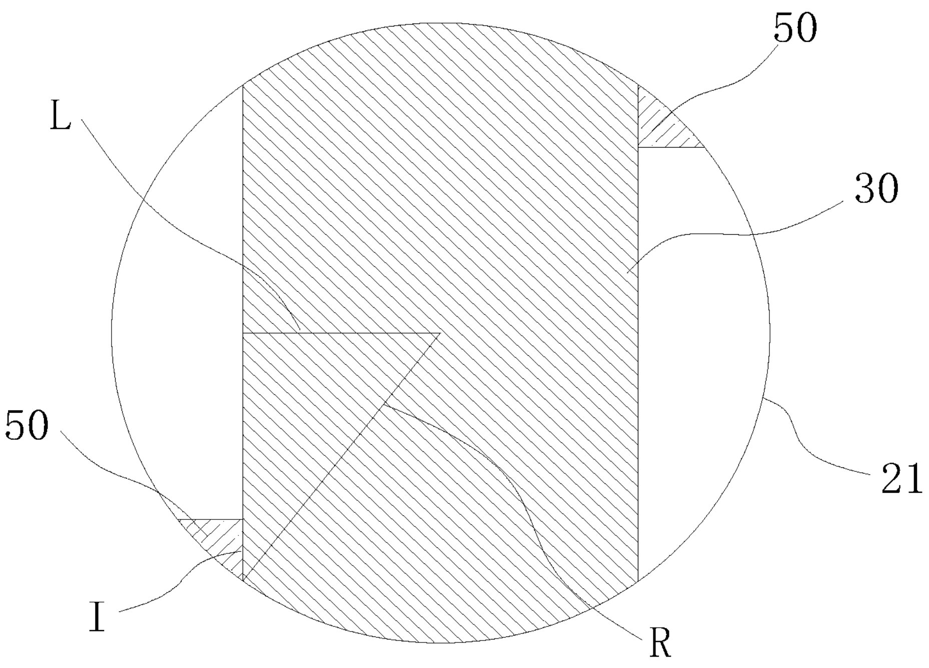
FIG. 5 is a schematic view of a valve rod and a limiting member assembled on an inner peripheral wall of an end cover according to one or more embodiments.

In addition, it should be noted that, referring to FIG. 5, a width of an end surface of the limiting member 50 in this embodiment for abutting against the valve rod 30 is defined as I, specifically, it can be calculated by formula: $I=\sqrt{R^2-L^2}-L$, wherein R is a rotation radius of the valve rod 30, and L is a half of a thickness of an end of the valve rod 30 extending out of the valve body 10. For example, referring to FIG. 5, the two end surfaces of the limiting member 50 provided in this embodiment for abutting against the valve rod 30 can be two mutually perpendicular planes, so that the limiting fit between the valve body and the limiting member is in a surface-to-surface contact manner, which makes the limitation more reliable. It can be understood that through the above-mentioned structural arrangement, a calculation of the width of the end surface of the limiting member for abutting against the valve rod can be realized, and one skilled in the art can use this formula to set a selection parameters according to an actual working conditions, which will not be described in detail here. It should be noted that the thickness of the valve rod 30 refers to a distance between two end surfaces of the valve rod 30 for abutting against the limiting member 50.

Of course, in other embodiments, the valve rod 30 can also be in cylindrical or other irregular shapes. For example, an edge of the valve rod 30 is provided with a convex edge for abutting against the limiting member 50. The limiting member 50 can abut against different edges of the valve rod 30 through the first abutting surface 51 and the second abutting surface 52, respectively. At this time, the valve rod and the limiting member are in line-to-surface contact fit, so as to limit the valve rod 30. Besides, in other embodiments, the first abutting surface 51 and the second abutting surface 52 of the limiting member can be designed as arc surfaces, and the two end surfaces of the valve rod 30 in the thickness direction are designed as planes, so as to realize line-to-surface contact fit. In this way, the valve rod 30 with different shapes can be matched and meet different application requirements while meeting the requirements for limiting the rotation angle of the limiting member 50 with respective to the valve rod 30.

In this embodiment, the number of the limiting members 50 can be one, so as to facilitate an assembly of the limiting members 50 on the inner peripheral wall 21 of the end cover 20.

Figure 3:
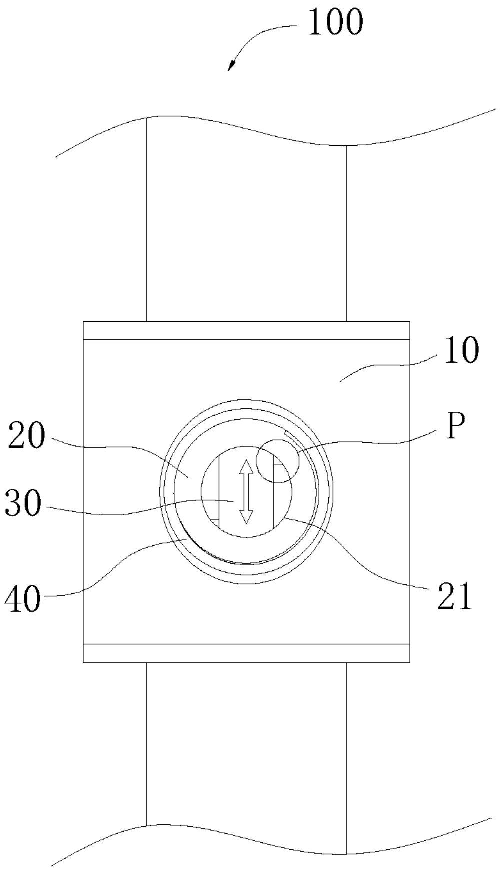
FIG. 3 is a partial view of a ball valve from other perspectives according to one or more embodiments.
Figure 4:
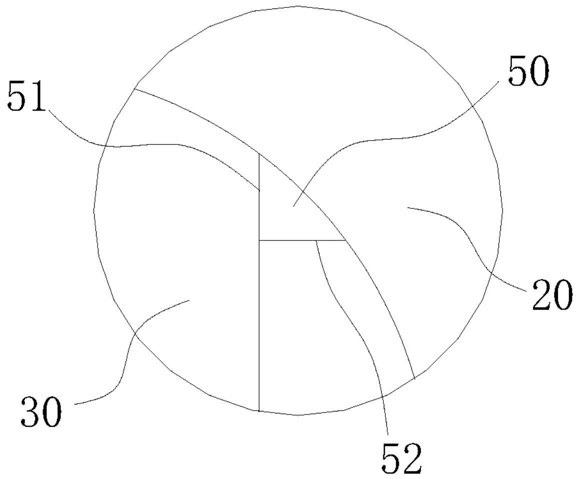
FIG. 4 is an enlarged view of P part in FIG. 3.

In other embodiments, the number of the limiting members 50 can be two, and two limiting members 50 are symmetrically arranged with respect to an axis of the valve rod 30, so as to further enhance a reliability of the limiting members 50 in restricting the rotation angle of the valve rod 30. This configuration helps prevent phenomena that the limiting member 50 may dislodge or deform due to excessive force in a process of opening and closing the ball valve, thus avoiding any limitation failure. Moreover, the two limiting members 50 are symmetrically positioned so that the end surfaces of the valve rod 30 on both sides are in contact with an end surface of the limiting member 50 after the valve rod 30 has rotated into position. This arrangement restricts the rotational position of the valve rod 30. With the two limiting members 50 in contact with the valve rod 30, the forces acting on the valve rod 30 are evenly distributed, ensuring uniform stress distribution and prolonging the life of the limiting member 50. Referring to FIGS. 3 and 5, the two limiting members 50 are symmetrically positioned relative to the axis of the valve rod 30 on the end cover 20. When the valve rod 30 is in the rotated position, the two limiting members 50 are symmetrically disposed on the end cover 20 with respect to the axis of the valve stem 30.

Furthermore, the limiting member 50 of this embodiment is disposed on the inner peripheral wall 21 of the end cover 20 by welding. Alternatively, the limiting member 50 and the end cover 20 are connected to form an integrated structure, enabling an assembly connection between the limiting member 50 and the end cover 20. This facilitates an installation of the limiting member 50 on the inner peripheral wall 21 of the end cover 20, reducing processing steps and costs.

Figure 7:
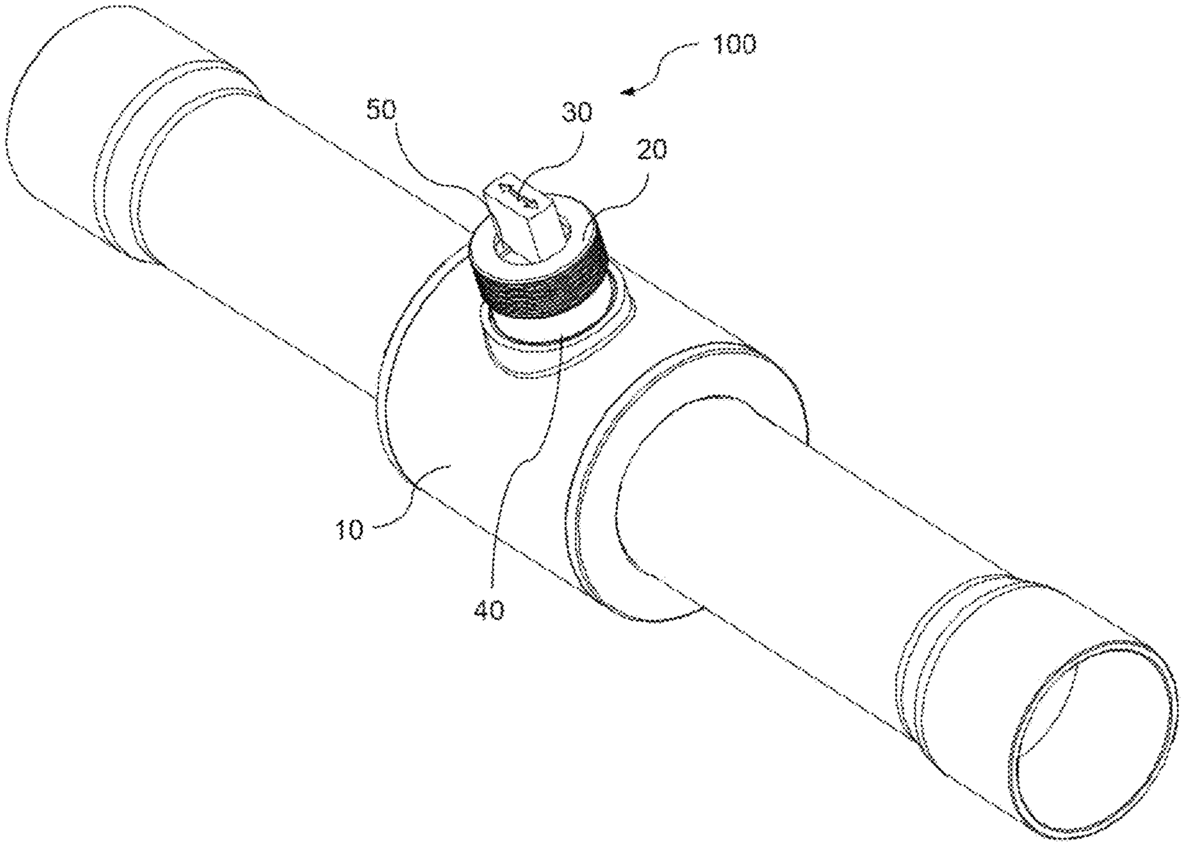
FIG. 7 is a schematic view of a ball valve according to one or more embodiments from another angle.

In this embodiment, referring to FIG. 7, a projection of the inner peripheral wall 21 of the end cover 20 to the limiting member 50 covers the limiting member 50, allowing the end cover 20 to shield and protect the limiting member 50 from being influenced by external components in the operation of the ball valve 100. Of course, it should be noted that the limiting member 50 is not limited to being accommodated in the end cover 20, and it is also feasible for the limiting member 50 to partially protrude from the end cover 20, which will not be described here.

In this embodiment, the valve rod 30 is provided with a first step surface 31, and an end surface of the limiting member 50 towards the valve body 10 abuts against the first step surface 31. This configuration enables the limiting member 50 to restrict an assembly of the valve rod 30 on the end cover 20, so as to prevent the valve rod 30 from being forced out of the valve body 10 by a high-pressure medium in the valve body 10.

Furthermore, the valve rod 30 of this embodiment is provided with a second step surface 32, and the second step surface 32 abuts against an end surface of the end cover 20 towards the valve body 10. This configuration enables the end cover 20 to restrict an assembly of the valve rod 30, so as to prevent the valve rod 30 from being forced out of the valve body 10 by the high-pressure medium in the valve body 10.

In addition, it should be noted that the ball valve 100 of this embodiment can be made of stainless steel or copper, and those skilled in the art can choose as required.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

One of ordinary skill in the art should recognize that the above embodiments are used only to illustrate the present disclosure and are not used to limit the present disclosure, and that appropriate variations and improvements to the above embodiments fall within the protection scope of the present disclosure so long as they are made without departing from the substantial spirit of the present disclosure.

What is claimed is:

1. A ball valve, comprising a valve body, an end cover and a valve rod, wherein the end cover is installed on the valve body, and one end of the valve rod is rotatably installed in the valve body, the other end of the valve rod extends out of the valve body through the end cover;

wherein a limiting member is arranged on an inner peripheral wall of the end cover, the valve rod is capable of being limited by the limiting member to allow a maximum rotating angle of the valve rod in the end cover to be 90 degrees;

the limiting member partially protrudes from the end cover;

a rotating radius of the valve rod is defined as R, a half of a thickness of an end of the valve rod extending out of the valve body is defined as L, and a width of an end surface of the limiting member for abutting against the valve rod is defined as I, wherein, the radius R of rotation of the valve rod, the half L of the thickness of the end of the valve rod extending out of the valve body and the width I of the end surface of the limiting member for abutting against the valve rod satisfy following formula:

$$I=\sqrt{R^2-L^2}-L.$$

2. The ball valve of claim 1, wherein the valve rod is capable of being limited by the limiting member in a surface-to-surface contact manner.

3. The ball valve of claim 2, wherein the limiting member is provided with a first abutting surface and a second abutting surface, the first abutting surface is perpendicular to the second abutting surface, the limiting member is capable of limiting the valve rod through the first abutting surface and the second abutting surface respectively.

4. The ball valve of claim 1, wherein the number of the limiting member is one; or, the number of the limiting member is two, and the two limiting members are symmetrical with respect to an axis of the valve rod.

5. The ball valve of claim 1, wherein the limiting member is disposed on the inner peripheral wall of the end cover by welding; or, the limiting member and the end cover are an integrated structure.

6. The ball valve of claim 1, wherein the valve rod is provided with a first step surface and an end surface of the limiting member towards the valve body abuts against the first step surface.

7. The ball valve of claim 1, wherein the valve rod is provided with a second step surface and the second step surface abuts against an end surface of the end cover towards the valve body.

8. The ball valve of claim 1, wherein a valve seat is fixed on the valve body by welding and the end cover is connected to the valve seat by a threaded way.

* * * * *